May 23, 1933.  E. D. EINSEL ET AL  1,910,596
ANIMAL FEEDER
Filed Sept. 12, 1931
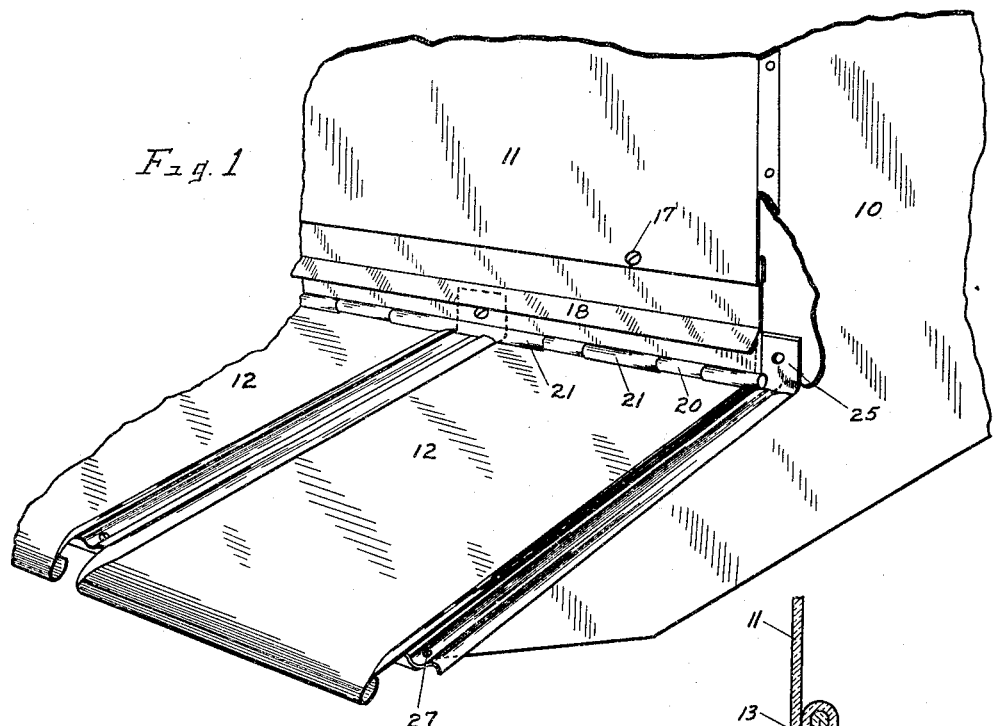
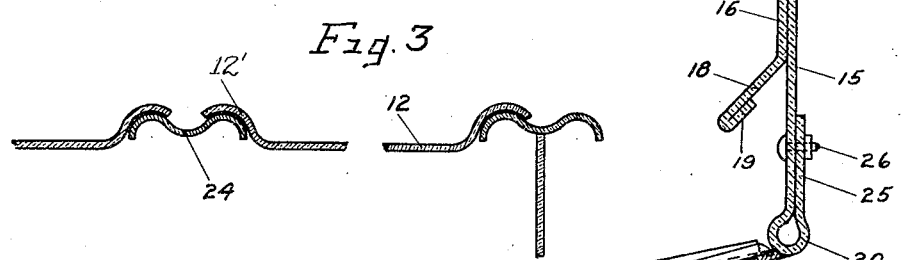
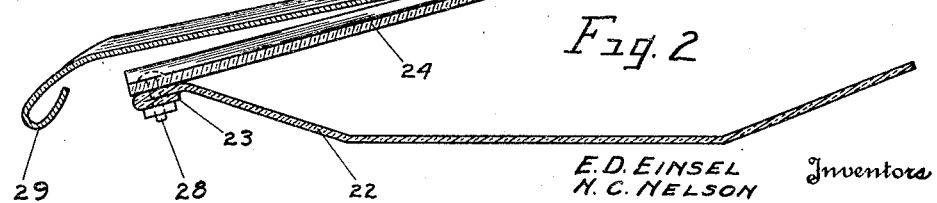
E. D. EINSEL
H. C. NELSON
Inventors
By Emil F. Lange
Attorney Patented May 23, 1933

1,910,596

UNITED STATES PATENT OFFICE

ELMER D. EINSEL AND NELS C. NELSON, OF HASTINGS, NEBRASKA, ASSIGNORS TO THE HASTINGS EQUITY GRAIN BIN MANUFACTURING COMPANY, A CORPORATION OF NEBRASKA

ANIMAL FEEDER

Application filed September 12, 1931. Serial No. 562,510.

Our invention relates to animal feeders and particularly to animal feeders which are especially designed for supplying feed to hogs. Such feeders are usually provided with hinged lids which the hogs may raise with their snouts to gain access to the feed in the container.

The primary object of the invention is the provision of a construction which is as nearly water tight as it is possible to make a hog feeder. In accomplishing this, it is our object to provide a wall construction having a drip ledge for conducting rain and other water on to the closures, the purpose of the drip ledge being to keep the water away from the hinges of the closures, the side wall construction also including an imbricated seam which resists the entrance of water. Along with these two structures there is also included a closure and brace construction to effectively drain the water which falls on to the closures or braces.

Having in view these objects and others which will be pointed out in the following description, we will now refer to the drawing, in which Figure 1 is a view in perspective of a corner of the hog feeder showing particularly the closures, braces, drip ledge, and seam, a small portion being broken away to more clearly disclose the construction.

Figure 2 is a view partly in section and partly in end elevation of the corner structure of the hog feeder, a closure and brace being shown in end elevation of the hog feeder.

Figure 3 is a transverse sectional view of the closure and brace construction and showing particularly the drainage features of the closure and brace.

The feeder itself is the same as that disclosed in our copending application, Serial Number 555,090, filed August 4, 1931, the structure herein described being applied to that hog feeder.

The hog feeder includes similar end walls 10 and similar front and back walls 11, the front and back walls 11 being identical, the arrangement being such that the hogs may gain access to the feed through openings in both the front and the back of the hog feeder. Hog feeders are distinguished from nearly all other animal feeders in that they may be provided with hinged lids 12 which the hogs may lift with their snouts by going through their natural motions when rooting.

As shown in Figure 2, the front or rear wall includes a main portion 11 and a lower portion. The portion 11 is folded upon itself at 13 and is then turned down into a portion 14, the portions 13 and 14 being spaced to receive the lower portion of the wall. This lower portion of the wall is also made of sheet metal being folded upon itself to form contiguous parts 15 and 16 which enter the space between the parts 15 and 16 which enter the space between the parts 13 and 14 of the wall 11. These are tightly secured together by means of a plurality of bolts 17. Water on the outer side of the wall 11 will flow down but it can not enter the seam.

The part 16 is downwardly and outwardly inclined at 18 and its free end is turned under at 19. The water falling from the outer surface of the wall 11 thus falls on to the inclined drip ledge 18 and flows off from the rounded lower edge of the drip ledge.

The part 15 is provided at its lower extremity with ears 20 which are rolled to form hinge members. These rolls alternate with similar rolls 21 on the closures 12 so that a pin may be inserted through the rolls 20 and 21 to provide the closures with hinges of the piano hinge type. Such hinges give very little opportunity for the entrance of water but their position with respect to the drip ledge 18 is such that practically no water can reach the hinge.

Such hog feeders are provided with feed troughs extending away from the food receptacle. In Figure 2 it will be observed that the floor 22 of the food receptacle extends to some distance outwardly from the hinge of the closure. This floor is folded upon itself at its outer extremity at 23. The rough usage to which the hogs subject such a feeder demands that the trough be adequately braced by means of suitably spaced braces 24.

These braces, however, have two additional functions in the present hog feeder. They are so spaced as to provide ample room for each hog but to prevent the encroachment of a hog on the space which the next hog occupies. In the present instance these braces are purposely designed to drain the water and to prevent the entrance of the water to the feed.

The braces 24 are rolled into the cross-sectional form shown in Figure 3. The middle portion constitutes the channel for the drainage of the water while the two end portions are so curved as to keep the water away from the feed in the trough. The surfaces are all in the form of gentle and gradual curves not only for ease of manufacture and for durability in use but also to be more effective in draining the water. These gentle curves, moreover, prevent the accumulation of filth which is particularly important in any hog feeder. Likewise, the body portions of the closures 12 effectively provide for the drainage of water while the side portions are rolled into curved form at 12' to seat against the curved side walls of the braces 24.

The braces 24 may be secured to the walls of the hog feeder in any desired manner. In the present instance their inner end portions are upturned at 25 and provided with apertures for the reception of bolts 26 passing through the portions 15 of the lower front or rear wall 15 to hold the parts rigidly connected together. The lower portions of the braces are provided with apertures at 27 for the reception of bolts 28 or similar fastening devices passing through the folded portion of the floor 22. In order to prevent injury to the hogs' snouts and to facilitate the opening of the closures 12, a roll construction such as that shown at 29 is employed. This roll construction is so positioned that it facilitates the drainage and carries the water beyond the outer edges of the hog feeder.

From the foregoing description it will be apparent that the present features of the animal feeder have been designed with sole reference to the maintenance of the feed in a dry and sanitary condition until it reaches the animal. The problem is largely a drainage problem which is fully solved by the above described construction. The water which flows down over the wall 11 is dropped from that wall to the drip ledge 18. The construction of the joint between the upper and lower portions of the wall is such that no moisture can enter the food receptacle at the joint. The water, in fact, does not even reach the joint since it is caused to drop from the upper portion 11 of the wall. From the drip ledge 18 the water flows down onto the closures 12 and onto the braces 24. After the water first strikes the drip ledge 18 its velocity is checked on the inclined drip ledge so that it will not splash against the hinge. The drip ledge overhangs the hinge so as to completely prevent access of the water to the hinge where it might otherwise enter the feed receptacle. The water which flows onto the closures 12 is immediately carried downwardly and conducted away from the feeder by passing over the rolled edge 29. Each closure 12 thus provides an ample channel for the flow of the water. That portion of the water which flows onto the braces 24 is carried down the middle channel where it also is delivered away from the feeder. The rolls of the closures 12 and of the braces 24 are in the form of gentle curves so that no filth can accumulate as would be the case with channels having sharp corners.

Having thus described our invention in such full, clear, and exact terms that its construction and operation will be readily understood by others skilled in the art to which it pertains, what we claim as new and desire to secure by Letters Patent of the United States is:

1. An animal feeder including a container having walls with a trough projecting therefrom at the base thereof, a closure having a hinge connection with one of said walls at the juncture with the trough, said wall having an upper and a lower portion, the lower of said portions having a fold upon itself and being secured at said fold in imbricated relation to said upper portion, said lower portion terminating at one edge in a downwardly and outwardly projecting drip ledge overhanging said hinge for draining water away therefrom and terminating at its other edge in a hinge member of said hinge.

2. An animal feeder including a container with a trough projecting therefrom at the base thereof, braces extending transversely of said trough, said braces having concave drainage channels in their middle portions and downturned rolls at their outer edges, and closures having raised rolls at their outer edges with downwardly projecting curved outer walls to seat within the drainage channels of said braces.

3. An animal feeder including a container having walls a trough projecting therefrom at the base thereof, downwardly and outwardly inclined braces extending transversely of said trough, said braces having rounded concave drainage channels in their middle portions and downturned rolls at their outer edges, closures having hinged connection with one of said walls at the juncture with said trough, said closures having raised rolls at their outer edges with downwardly projecting curved outer walls to seat within the drainage channels of said braces, and means for draining water away from said hinge.

4. An animal feeder including a container with a trough projecting therefrom at the base thereof, downwardly and outwardly inclined braces extending transversely of said trough, said braces having rounded concave drainage channels in their middle portions and downturned rolls at their outer edges, closures having hinged connection with a wall of said container at the juncture with said trough, said closures having raised rolls at their outer edges with downwardly projecting curved outer walls to seat within the drainage channels of said braces, and means for draining water away from said hinge and upon said closure, said means including a drip ledge projecting downwardly and outwardly from the wall of said container and overlying the hinge.

5. In an animal feeder, a feed container having walls and a feed trough projecting outwardly from the base thereof, said trough having an outer wall and a pair of side walls with downwardly and outwardly inclined upper edges, downwardly and outwardly inclined braces secured at their extremities to one of said walls and to the outer wall of said trough, said braces each having a pair of longitudinal convex upper surfaces and a longitudinal concave upper surface therebetween, and hinged closures for said trough, said closures having upwardly and laterally curved convex upper surfaces and concave lower surfaces adapted to seat on the convex upper surfaces of said braces.

In testimony whereof we affix our signatures.

ELMER D. EINSEL.
NELS C. NELSON.